Feb. 21, 1961 A. G. BODINE, JR 2,972,380
ACOUSTIC METHOD AND APPARATUS FOR MOVING OBJECTS
HELD TIGHT WITHIN A SURROUNDING MEDIUM
Filed Feb. 20, 1956 7 Sheets-Sheet 2

INVENTOR.
ALBERT G. BODINE JR.
BY
ATTORNEY

INVENTOR.
ALBERT G. BODINE JR.
ATTORNEY

Feb. 21, 1961  A. G. BODINE, JR  2,972,380
ACOUSTIC METHOD AND APPARATUS FOR MOVING OBJECTS
HELD TIGHT WITHIN A SURROUNDING MEDIUM
Filed Feb. 20, 1956  7 Sheets-Sheet 5

*INVENTOR.*
ALBERT G. BODINE JR.
BY
ATTORNEY

United States Patent Office 2,972,380
Patented Feb. 21, 1961

2,972,380

ACOUSTIC METHOD AND APPARATUS FOR MOV-
ING OBJECTS HELD TIGHT WITHIN A SUR-
ROUNDING MEDIUM

Albert G. Bodine, Jr., 13120 Moorpark St.,
Van Nuys, Calif.

Filed Feb. 20, 1956, Ser. No. 566,628

18 Claims. (Cl. 166—46)

This invention relates generally to methods and apparatus for loosening and/or pulling or removing objects stuck or frozen by static friction in other objects, for example, pipe such as liners, casing or drill pipe, or other objects or "fish" which have become stuck by static friction in oil wells. It relates also, in a still broader aspect, to longitudinal movement of members in a surrounding medium, and accordingly, is applicable not only to removal of stuck members, as pipe fast in a well bore, but to driving frictionally bound members downwardly in the well, and, in another application, to driving of piles into the earth.

One primary object of the invention is the provision of improved methods and apparatus for loosening and/or moving frictionally stuck or bound members by transmitting acoustic waves therethrough under conditions of standing wave resonance, utilizing novel apparatus and procedures by which very tightly bound members may be readily broken loose and removed, or driven deeper.

Taking for illustration oil well casing stuck in the cement within the well, the invention, in one of its illustrative forms, provides for setting up in the casing a resonant acoustic longitudinal standing wave of high amplitude, thereby causing a cyclic force in a longitudinal direction to be exerted by the casing on the cement at the stuck point, as well as a cyclic elastic contraction and expansion of the casing at the stuck point, which is at a velocity node of the standing wave. Impedance mismatch and phase differences between the casing and the surrounding media in which the same is frozen prevent the surrounding media from contracting and expanding either in step with or to the same degree as that which the stuck region of the casing may readily undergo under proper drive. Frictional resistance losses in any media also results in failure to transmit the alternate expansion and contraction from the stuck casing to the media without material loss of amplitude. The lesser amplitude of the periodic contraction and expansion of the surrounding media means that the stuck casing is clear of the media for a time during each contraction half cycle. Moreover, phase difference between the expansion and contraction cycles of the stuck casing and the surrounding media means that the casing is undergoing contraction during at least a part of the time that the surrounding media is undergoing its expansion half-cycle, with resulting still greater momentary clearance. In effect, the surrounding media "stand back" while the stuck casing periodically contracts. Such action rapidly loosens the stuck or frozen casing, and it may then be elevated by pulling upwardly on it. It is often desirable to pull upwardly on the casing while it is undergoing its cyclic motion relative to the surrounding media, with the result that it moves upwardly by small increments as successive momentary clearances occur. In other cases, it is found preferable to permit the casing, or a large longitudinal fraction thereof, to stand in compression, with the result that the casing moves downward as it is loosened. After complete loosening, it may be readily elevated. A feature of the invention is the control of the tension and/or compression in the casing to accomplish most advantageous performance in any given case.

In order to achieve the above described loosening action in cases of tightly frozen pipe or casing, I have found it necessary to transmit relatively powerful acoustic waves down the pipe to the site where the pipe is stuck in the cement, whereby to develop cyclic forces exceeding and working against the holding strength of the cement or other binding medium, and to accomplish this, certain novel relationships between the source of the acoustic waves, the stuck pipe, and any supporting means for the equipment, have been found to be of prime importance.
In this connection, I utilize the concept of mechanical impedance, which, in this case, signifies the ratio of total cyclic peak force to displacement velocity at any given point in the acoustic wave system. The stuck region of the pipe is a region of high impedance, being at a velocity node of the standing wave system, while the upper end of the pipe is a region of lower impedance, being at a velocity anti-node of the standing wave system. The acoustic wave source may be a very powerful mechanical vibrator. Now, I have found that it is of utmost importance, if the necessary substantial power for tightly stuck jobs is to flow from the wave generator into the pipe in which the standing wave is to be developed, that the coupling between the generator and the pipe have an acoustic impedance which is of at least as high an order of magnitude as that of the upper end portion of the pipe at the coupling point. This impedance requirement may be met by use of a firm or rigid coupling means, for example, serrated wedge slips, or mechanical clutch jaws, acting directly between the generator case or frame and the pipe. A low impedance coupling, i.e., of lower order than that of the upper end of the pipe, involving, for instance, a flexible element, such as a common suspension cable, or the like, lacks the ability to transmit the high cyclic force that is available from the necessary high power generator, and apply it to the pipe. Thus a high impedance coupling, i.e., one of an impedance magnitude of an order comparable to that of the upper end portion of the pipe at the point where the coupling is to be made thereto, is an absolute requisite, and is satisfied by any mechanical coupling device of sufficiently high impedance. I sometimes prefer for this purpose a rigid coupling device comprising well known serrated wedge slips rigidly connected with the generator and engaged directly with the casing. Certain possible modifications within the scope of the invention will be described hereinafter.

Also any supporting or suspension means for the acoustic wave generator must, I have found, have a relatively low mechanical impedance, and may be a flexible cable, desirably including a spring vibration-isolator, or other relatively compliant element, so as to prevent material transmission of vibratory power through such supporting or suspension means.

Still further, I have found it highly important to employ an acoustic wave generator which is operable at a resonant frequency of the stuck column, and one whose output impedance is comparable to the impedance of the pipe at the point of coupling thereto.

An important incident of the setting up of the described resonant acoustic standing wave in the pipe or other member to be loosened is an energy storage property inherent in resonant systems of the character in question. A large quantity of acoustic energy is periodically delivered to the vibrating pipe, stored therein, and periodically released therefrom so as to deliver large cyclic forces to the stuck point. The resonant casing thus inherently functions as a large energy storage reservoir, giving the system a high Q factor, i.e., large flywheel effect, comparable to the tank circuit of an electric oscillator, and assuring large energy delivery and corresponding force application to the stuck region of the pipe.

The invention will be further understood from the following detailed description of a number of related illustrative embodiments, reference for this purpose being had to the accompanying drawings, in which.

Reference being first directed to the embodiment of the invention shown in Figs. 1-4, a supporting platform 20 is provided comprising two longitudinally extending side channels 21 adapted to rest on the earth, or derrick platform, and these members 21 are connected by suitable transverse members, including a member 22 at one end thereof, and a bed 23 at the other end thereof for the support of a multiplicity of springs 24 which in turn support a rigid but bodily vibratory platform 25. This platform 25 forms the base of an acoustic wave generator generally designated at G, and is also equipped with means for rigidly coupling to the member to be loosened, in this example, a column of well casing C assumed to be stuck or frozen so tightly within oil well bore B as to defy known methods of extraction.

Considering the stationary platform bed 23 and the vibratory platform 25 in more particular, it will be seen that these members are formed with vertically aligned pockets 30 and 31, respectively, for the reception and positioning of the end portions of the springs 24. These members 23 and 25 are also formed with deep, vertically aligned notches 32 and 34, respectively, extending inwardly from the near end of the structure and formed with half-round inner ends, as indicated at 33 in Fig. 1. These aligned notches 32 and 34, which are thus of generally U-shape, reach inwardly to the center of the bed 23 and platform 25 and are adapted to receive the casing C which is to be loosened. The outer ends of these notches are closed when the apparatus is in operation by filler blocks 35, secured in place as by means of bolt-pins 36. To install the device in position to loosen a length of well casing C stuck in an oil well, the blocks 35 are first removed, and the apparatus moved end-wise towards the casing so that the casing is received in the notches 32 and 34, as to the position shown in the drawings. The blocks 35 are then reinstalled, their purpose being of course to assure proper rigidity of the structure.

Four vertical guide pins 38 are provided, two extending upwardly from bed 23 on each side of vibratory platform 25, and the latter is furnished with guide sleeves 39 slidably fitted on the pins 38.

The generator G includes two parallel shafts 40 mounted in bearings 41 on platform 25 on opposite sides of notch 32, and these shafts 40 carry at their opposite ends unbalanced masses 42. The two shafts 40 are driven through universal joints 43 from transmission shafts 44 coupled through universal joints 45 to a pair of shafts 46, and the shafts 46 carry meshing spur gears 47 and are provided with bearings within a gear and bearing case 48 mounted on the aforementioned frame member 22. One of the shafts 47 is provided with a chain sprocket 49 driven by a chain 50 from a suitable source of power, such as an internal combustion engine (indicated at E in Fig. 4) whose speed can be varied through a suitable range.

It will be seen that according to the arrangement described, the shafts 40 carrying the unbalanced masses 42 rotate in opposite directions. The weights or masses 42 are positioned on the shafts so that all of them move vertically in unison. The horizontal components of motion of the masses on the two different shafts, however, will be seen to be always in direct opposition. Accordingly, force components owing to horizontal components of movement of the weights are cancelled, while the vertical force components are additive. A vertically directed sinusoidal force is accordingly applied to the platform 25.

The springs 24 are made soft enough to substantially isolate the base frame from the resulting vibratory action of the platform 25. In terms of mechanical impedance, they constitute a very low impedance support for the vibratory platform. The desired "soft" spring support, of low impedance, permits powerful, high amplitude vibration of the platform 25, and of the casing clutched thereto, as presently to be described, without material transmission of vibration to the base frame, and to the derrick floor and/or the surrounding region of the earth. It permits concentration of the vibratory effort on the stuck casing that is to be loosened.

For the purpose of coupling the vibratory platform 25 to the casing, a shouldered bushing 50 is run down over the casing and fitted into the half-round end of the notch 32 in platform 25, and serrated wedge slips 51 are then inserted into a tapered opening 52 in this bushing, so as to firmly engage the casing. It will be seen that such a mechanical connection constitutes a coupling of high mechanical impedance, as defined hereinabove.

Figure 1:
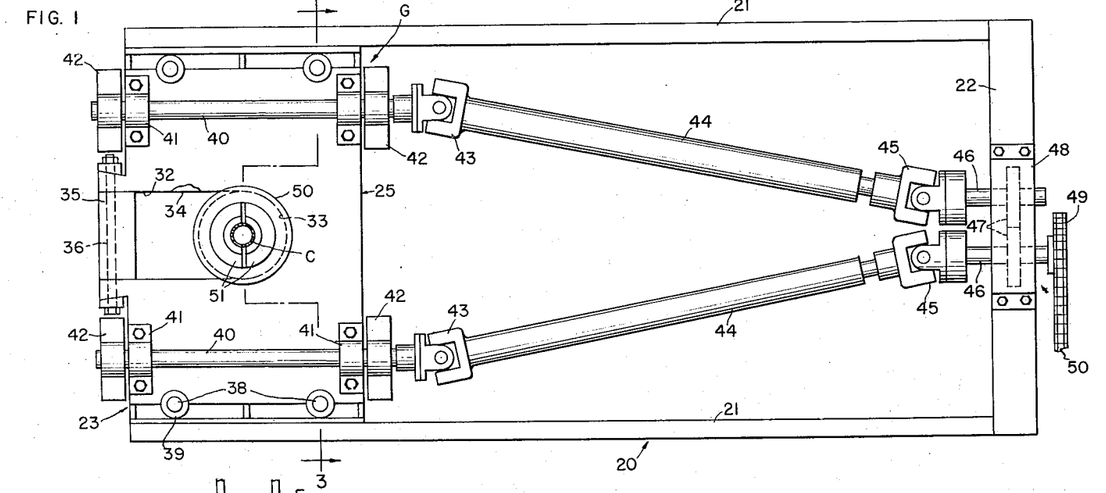
Fig. 1 is a plan view of one embodiment of the invention.
Figure 2:
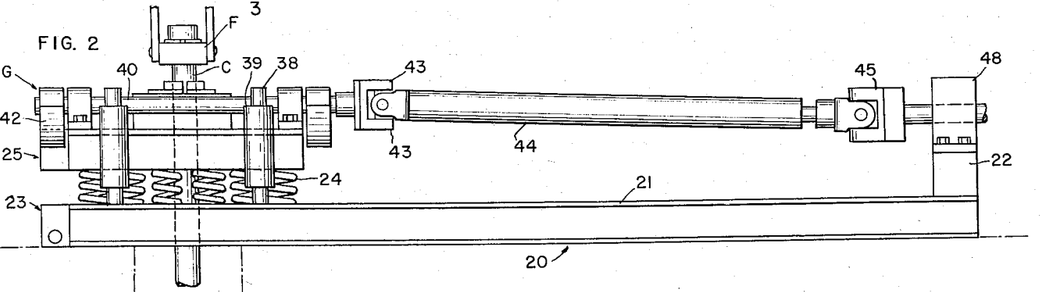
Fig. 2 is a side elevation of the apparatus of Fig. 1.

In the use of the apparatus the casing to be removed is first stretched upwardly a few feet by taking a strain on it with use of a casing elevator F and conventional oil derrick hoisting tackle (not shown) above, and the apparatus of the invention is then positioned around the exposed upper end portion of the casing as represented in Fig. 2. The wedge slips 51 are then dropped into position, and the tension in the derrick tackle then relaxed, the load being thus transferred through the slips to the platform 25, with the result that springs 24 compress somewhat to balance the tension in the casing.

Depending on the length and weight of the casing, the depth to the stuck point, the extent and fastness of the frictional bind, etc., it may be desirable to take a very considerable upward pull on the casing before coupling the generator platform to it. It may, for example, be best to take a sufficient upward pull that the casing is in tension the entire distance from the stuck point to the generator platform. In other cases, it has been found preferable to take only sufficient upward pull in the casing to permit it to be coupled to the vibratory generator platform. The tension then extends down only a relatively short distance to a "neutral point," below which it stands in compression with its point of support being the area frictionally bound in the surrounding media. I have found considerable practical advantage in adjusting the vertical position of the neutral point, and therefore the relative proportions of the casing in tension and in compression, as will be further explained hereinafter.

Figure 4:
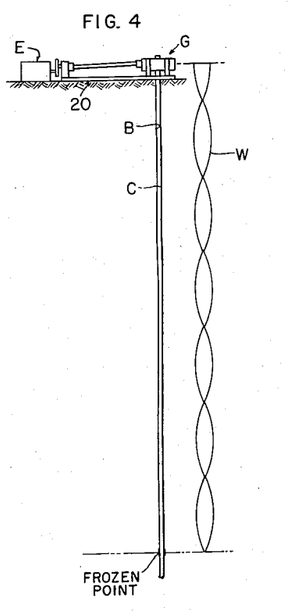
Fig. 4 is a diagrammatic view showing a casing to be loosened by the apparatus of Figs. 1-3 and showing also a standing wave such as is developed along the length of the casing.

The "neutral point" having been vertically positioned as desired, the engine E or other prime mover coupled to the power shaft 46 for generator G is then driven, causing vertical oscillation of the spring support platform 25, as previously explained. The platform 25 being now firmly or rigidly coupled to the tensioned casing C by the bushing 50 and wedge slips 51, the upper end portion of the casing is correspondingly oscillated in a vertical direction, the casing being thus alternately elastically stretched and shortened. Such oscillatory movement of the upper end portion of the casing causes longitudinal transmission of acoustic (elastic) waves down the walls of the casing, the waves traveling with the speed of sound within the material of the casing. Such waves travel down the casing until they reach the site where the pipe is stuck or frozen in the surrounding medium, where they are reflected and returned in the upward direction. In terms of impedance the point where the casing is stuck is a point of high mechanical impedance, and the cyclic stresses in the casing are at maximum amplitude in that region, longitudinal motion or displacement being minimized, or approaching zero. Under such conditions, assuming the use of a self resonant system, e.g., a rotating mass oscillator driven by a gas engine, a resonant standing wave of an odd number of quarter wavelengths, as represented at W in Fig. 4, is developed in the casing between the stuck point (a velocity node) and the point when the casing is rigidly clutched by the vibrating oscillation generator (a velocity anti-node, and a point of lower impedance), the engine automatically operating at a speed dictated by the generator oscillation frequency at which such standing wave may be established. The stuck portion of the casing thus undergoes a high longitudinal stress cycle, with resulting alternating circumferential expansion and contraction. It should be understood that when a resonant longitudinal standing wave is established in a column, which is stuck or immobilized against longitudinal motion at a given point, a velocity node of the standing wave must necessarily occur at the stuck or immobilized point, and that a cyclic longitudinally-directed force will be exerted in the column, at the node, against the immobilizing medium. It should be understood that forces at a node at a free point in a column are opposed and dynamically balanced. When, however, a given column is held fast at an arbitrary point, the resonant standing wave set up in the column will have a node at the fast point, and, in general, the cyclic forces in the column on the acoustically free side of the fast point will not be dynamically balanced by like forces on the other side thereof, but will be exerted against and opposed by the immobilizing medium. Additionally, as mentioned heretofore, the elastic column, in which a longitudinal standing wave is sustained, alternately elastically dilates and contracts at the velocity antinode in step with alternating compressive and tension phases of the wave in the column. This follows from a phenomenon generally referred to as Poisson' Ratio, and consists in a radial dilation or contraction of an elastic column in response to compression or tension exerted in the column. Returning to a consideration of Figs. 1–4, the longitudinally-directed cyclic forces thus exerted by the casing on the medium in which the casing is struck, act to overcome the holding strength of the medium. The alternating dilations and contractions of the casting act also to overcome the holding strength of the medium. In connection with the latter effect, i.e., alternating dilation and contraction of the casing, owing to impedance mismatch between the casing and the medium in which it is frozen, e.g., cement, frictional losses between the members, and cyclic phase displacements, the cyclic contractions of the casing are not followed up by like contractions of the medium in which the casing has become frozen, and the bond is quickly broken.

If there is a stuck point further down, the standing wave pattern then immediately advances or lengthens to it, which establishes a new high impedance point, at a lower resonant frequency. The engine automatically slows down to drive the oscillator at this lowered frequency and the second stuck point is then broken free. Thus the pipe is progressively freed, and as the uppermost remaining stuck point progressively lowers, the standing wave pattern lengthens accordingly, and the resonant frequency correspondingly lowers. The gas engine, whose speed is automatically controlled by the resonant frequency of the vibrating system, gradually reduces its speed. With a fixed setting of the carburetor throttle, this progressive speed drop is usually accompanied by increased engine torque; and if the torque of the engine is great enough, it will finally take the oscillation generator over the existing resonance peak, and then speed up the system to the next higher resonance mode, where it will settle down, "locked-in" at the speed corresponding to the frequency of this mode. Again the system will continue dropping in frequency from this higher mode as the wave path increases with progressive loosening of the casing in the downward direction.

Of course, it is not essential that such a self-resonant system be employed. The generator G can, instead, be positively driven at such speed, using a controllable speed prime mover, that resonance is attained, the acoustic manifestations of which are easily observed by an operator experienced in acoustic machines.

If a sufficient tension is exerted in the casing to extend down to the stuck point (neutral point theoretically below the stuck point) the casing of course elevates as it is freed. If, however, the neutral point is located well above the stuck point, so that a substantial section of the casing stands in compression, the casing moves downward rather than upward as it is freed from the bonding medium. In the latter case, the casing in the stuck region may be driven considerably deeper into the well during the loosening operation. However, when the loosening operation has been completed, the casing may then be readily pulled from the well. This described lowering of the casing during the loosening operation is suggestive, incidentally, of application of the present invention to the driving of piles.

The best location of the "neutral point" depends, in practice, upon several variable factors. Thus, when the stuck point is not too deep, and the casing is not too heavy for the surface equipment available, it is of great advantage to take a sufficient upward pull to place it in tension all the way down to the stuck region. In such case, the equivalent "neutral point" is run down below the uppermost stuck point of the pipe. Under such circumstances, the pipe moves upwardly as it is freed. Assuming a single stuck region, it moves upwardly by increments on successive cyclic elastic contractions of the pipe at the stuck point. When the casing is heavy and the stuck point deep, it is often not feasible to exert a sufficient upward pull to tension it all the way down to the stuck region. Accordingly, in absence of the practical feasibility of a tensional bias, it is then often advantageous to provide a compressive bias, in which case a minimal upward pull is taken, so as to provide a high neutral point, and a long length of pipe standing in compression. This results, as earlier described, in downward movement of the pipe as it is loosened.

The low impedance support of the generator G by the soft springs 24, and particularly the rigid gripping of the casing by the generator, are highly important to the attainment of the above operation, especially when the casing is tightly stuck, and substantial vibrational energy must be transmitted down the casing. A relatively stiff or rigid (high impedance) support of the generator within the supporting frame would cause a substantial part of the available vibrational energy to be diffused in the supporting frame, derrick platform, and the surrounding earth, and it would be impossible to effectively concentrate the energy available on the job to be done, viz., the development of sufficiently high cyclic stress at the site of the bond to break the casing free. By using a low impedance support for the vibration generator, the generator is effectively isolated from the surrounding supporting structure and the earth. In some cases the generator may be mounted directly on the pipe to be loosened, and no additional support provided. It will be seen that in such a case, isolation of the generator from extraneous supporting structure is complete. By use of a rigid connection between the generator and the casing, i.e., one forming a coupling of impedance of the same order as that of the upper end of the casing, the vibrational energy available from the generator is directly transmitted into the casing without loss in the coupling and sets up the powerful resonant standing wave that is required in the casing to work it free. In addition, for efficient transfer of power from the generator G to the casing it is essential that the generator have an output impedance effectively near that of the free vibratory upper end portion of the casing to which it is coupled by the slips. The pipe has a relatively high acoustic impedance point where stuck in the surrounding medium, and a substantially lower impedance at its upper end, where gripped by the slips, by reason of the freedom of the upper end to undergo a substantial periodic displacement cycle. It is to this lower impedance that the output impedance of the generator must be related. The type of unbalanced rotating mass generator herein disclosed has an output impedance of the proper order for efficient power transmission to the pipe under the conditions described, and assures a substantial rate of acoustic power transmission through its high impedance coupling to the pipe, and thence down the pipe to the site where the pipe is frozen.

Figure 3:
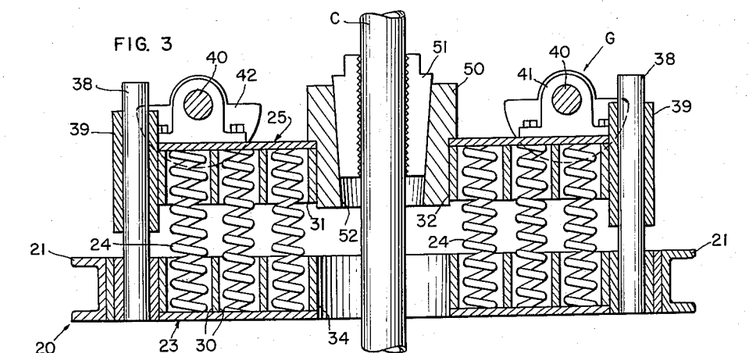
Fig. 3 is a section taken as indicated by broken line 3—3 of Fig. 1.
Figure 3A:
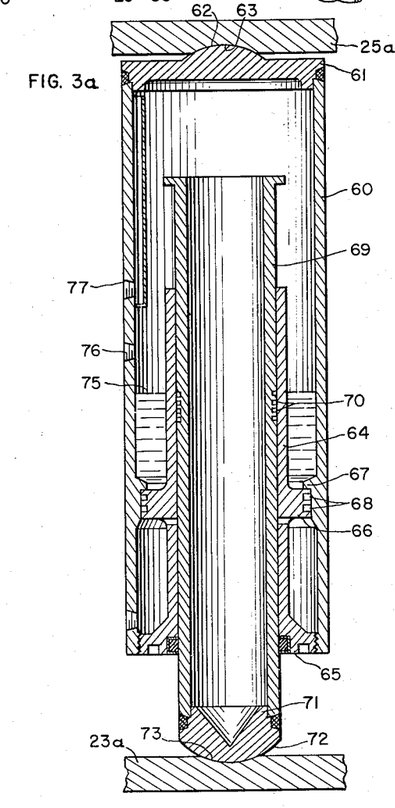
Fig. 3a is a vertical sectional view of an air spring which may be substituted for a coil spring shown in Fig. 3.

In Fig. 3a is shown an alternative air spring device which may be substituted for the coil compression springs 24 of the apparatus of Figs. 1–4. An outside cylinder 60 has a closure cap 61 welded to its top, and cap 61 is formed with a convex bearing surface 62 engaging in a complementary, concave seat 63 formed on the under side of the top wall 25a of the vibratory platform. Cylinder 60 contains an inner sleeve 64 extending upwardy therein from its lower end, sleeve 64 having at its lower end an annular flange 65 screw-threaded into the lower end of cylinder 60. An intermediate flange 66 on sleeve 64 abuts a positioning shoulder 67 formed inside cylinder 60, and is sealed to the inside surface of cylinder 60 by sealing rings such as indicated at 68. A sleeve 69 is telescopically received inside sleeve 64 and cylinder 60, being sealed to sleeve 64 as by sealing rings such as indicated at 70. To the lower end of this inner sleeve 69 is welded a closure 71 having a convex lower surface 72 seating in a complementary concave seat 73 formed on lower stationary platform wall 23a. Lubricating oil is introduced into the annular space between cylinder 60 and sleeve 64, above flange 66, to such a level as indicated at 75, by way of plugged port 76. The remaining chamber space inside cylinder 60 and within inside sleeve 69 is filled with air under pressure, which may be introduced via the plugged port 77. The air pressure within the system is of course developed to the level necessary for the support of the vibratory platform. Such an "air-spring" affords an unusually soft, low impedance device, such as is required for the proper yielding support of the vibratory platform, and is an effective isolator against transmission of vibratory energy to the stationary framework of the apparatus.

In Figs. 5–8 I have shown an alternative embodiment of the invention which is compact and effective and which is particularly designed for removal of stuck oil well drill pipe, and for the maintenance of a tension on the pipe to be pulled during the operation of generating the loosening wave pattern in the pipe. This embodiment represents also an especially good form for removing a stuck "fish" by use of a column of drill pipe carrying a grappling tool on its lower end, as will later be explained.

Figures 5, 5A:
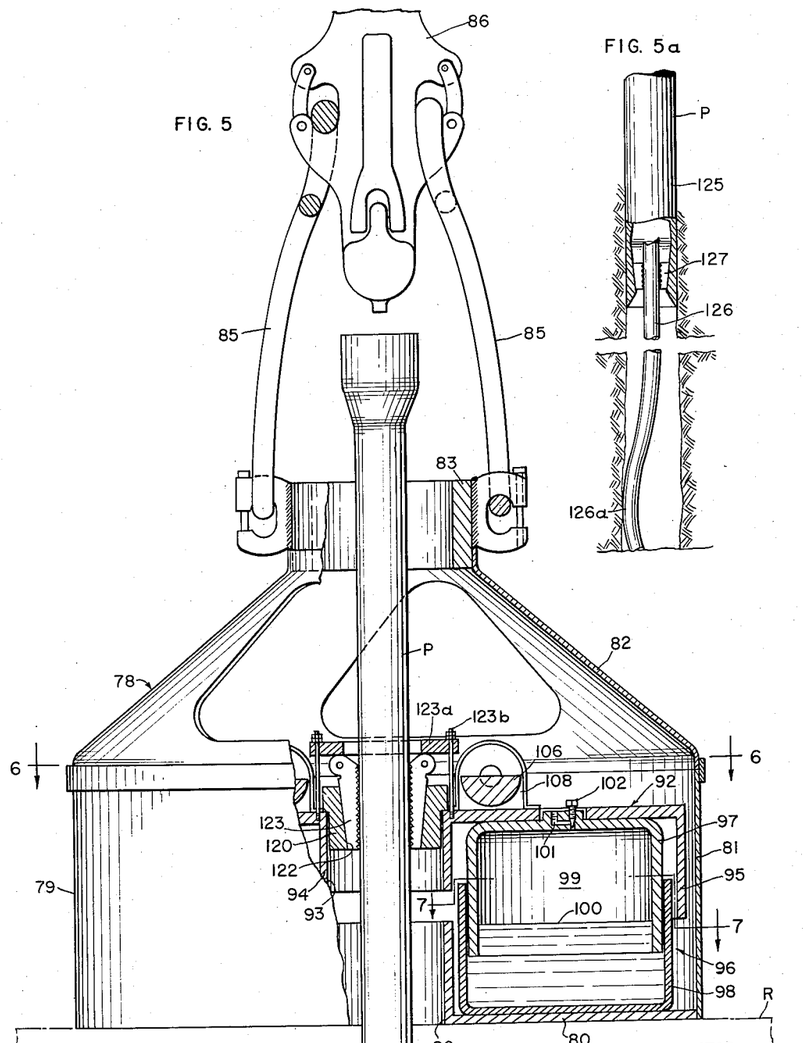
Fig. 5 is a side elevational view, partly broken away, showing another embodiment of the invention.
Fig. 5a shows the lower end portion of the pipe string operated upon by the apparatus of Fig. 5 as equipped, according to a modification of the invention, with a grappling tool engaged with a "fish" frozen within the well hole.
Figure 6:
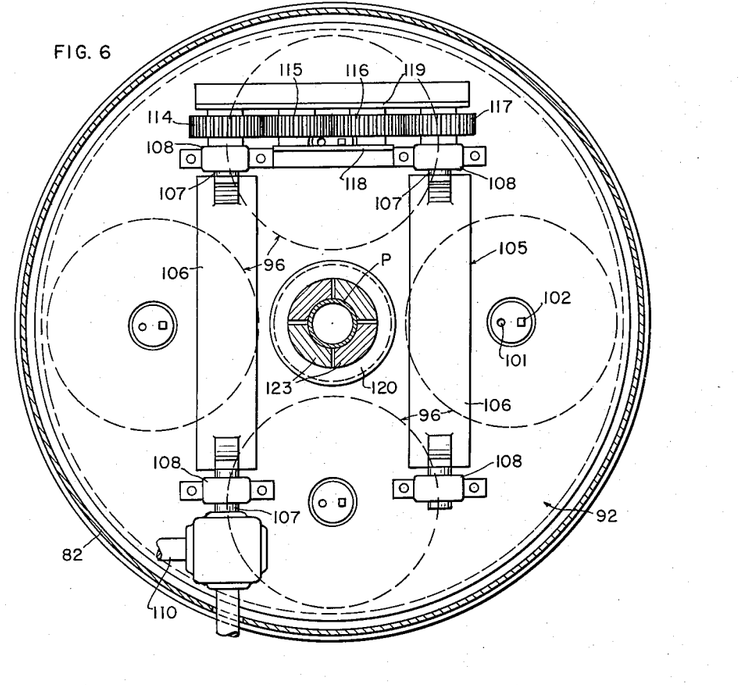
Fig. 6 is a horizontal section taken in accordance with line 6—6 of Fig. 5.
Figure 7:
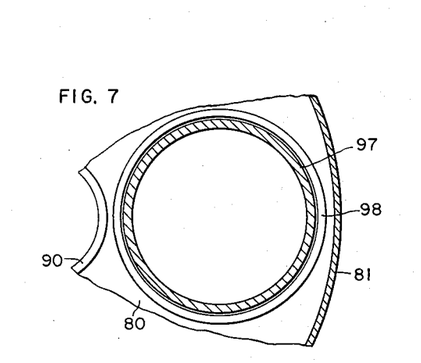
Fig. 7 is a section on line 7—7 of Fig. 5.
Figure 8:
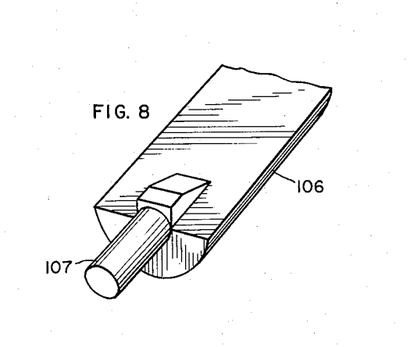
Fig. 8 is a perspective view of a portion of an eccentric rotor of Fig. 6.

The wave generator 78 includes a housing or carrier 79 embodying an annular base plate 80 which is adapted to rest on the rotary table, represented at R. A cylindrical side wall 81 extends upwardly from the outer periphery of this base plate, and a conical top member 82 extends from the upper edge of side wall 81 to a collar 83 at the top. This collar is supported through links 85 from a conventional hook 86, which will be understood as hanging, in turn, from the usual traveling block and cable (not shown) suspended in the derrick and by which an upward strain can be exerted on the apparatus and the pipe string gripped thereby.

The annular base plate 80 has a central aperture defined by an upwardly extending annular flange 90, through which the drill pipe P to be pulled is received with suitable clearance.

An annular vibratory platform 92 is provided inside wall 81, and has a central aperture 93 defined by depending annular flange 94, and an outside depending annular flange 95. The platform 92 is supported by four air springs 96 comprising telescoping upper and lower cup members 97 and 98, respectively, the latter mounted on base plate 80, and the former supporting the platform 92, as clearly shown in Fig. 5. The expansive and contractive chamber 99 within each of these air springs is filled with oil to a level such as indicated at 100 through an inlet 101 adapted to be closed by a needle valve 102. Pressurized air is thereafter introduced to chamber 99 through the inlet 101, and the inlet is then closed by means of valve 102.

Mounted on platform 92 is an acoustic wave generator 105 of the unbalanced mass type, similar in principle to that employed on the first described embodiment. Two parallel unbalanced mass rotors 106, one on each side of the central aperture in the platform, are provided at opposite ends with shaft extensions 107, and the latter are journalled in bearings 108 mounted on platform 92. The shaft extension at one end of one of the rotors 106 is driven by a hydraulic motor 110 mounted on platform 92, and it will be understood that this motor is powered by fluid received from a pump, which may in turn be driven by any suitable prime mover, such as an internal combustion engine, the pump and engine being omitted from the drawings. The shaft extension at the opposite end of the last mentioned rotor 106 carries a spur gear 114, meshing with an idler spur gear 115, which meshes in turn with another idler spur gear 116, and the latter meshes with and drives spur gear 117 on the shaft of the other unbalanced rotor 106, all as clearly represented in Fig. 6. The gear shafts may be supported by suitable bearings carried by brackets 118 and 119 mounted on platform 92. The gears 114 and 117 are all of the same size, and so phased that the unbalanced masses 106 move vertically in unison. It will also be seen that the unbalanced masses will be turned in opposite directions, so that lateral components of vibration are neutralized, while vertical components are additive.

A shouldered bushing or slip bowl 120 is seated in central platform aperture 93, its shoulder resting on the platform, and this bushing or slip bowl has tapered opening 122 adapted to receive serrated wedge slips 123 designed to engage and rigidly grip drill pipe P.

The apparatus is lowered by hook 86, and the derrick suspension means above, down over the protruding upper end portion of drill pipe stem P onto the rotary table indicated in dot-dash lines at R. The wedge slips 123 are of course removed during this lowering operation. Two alternative procedures are then available. The links 85 may be removed from hook 86, and a drill pipe elevator lowered from above and engaged with the upper end portion of the drill stem. The drill stem may then be stretched upwardly by taking a pull on it with this suspension means, after which the wedge slips 123 are driven into place to grip the pipe. In some cases, it may become desirable to clamp the slips tightly in position, and for this purpose any conventional clamping means may be employed, for example, a ring 123a engaging the tops of the slips and secured by studs 123b threaded into platform 92. The wave generator 105 may then be operated and it will be evident that the operation will in this case be analogous to that described in connection with the earlier embodiment. The tension taken in the pipe P may extend all the way down to its stuck point, as is often preferred; or only a relatively short distance, so that a neutral point occurs well up the pipe, with the extent of the pipe below the neutral point standing in compression.

Alternatively, the wedge slips 123 may be driven into place as soon as the apparatus has been lowered onto the rotary table, and the entire apparauts then pulled upwardly for a distance by means of the hook 86 and suspension means above. In this case, the entire apparatus is thus lifted off the rotary table as tension is taken in the drill pipe. The acoustic wave generator 105 is then operated with the apparatus thus suspended in mid air, out of engagement with the table. It will be seen that in this case, a constant upward pull is exerted on the drill pipe, and this pull may be made sufficient to extend the tension in the pipe all the way down to the stuck point. In addition, the apparatus and the drill pipe gripped thereby may be further elevated by the tackle supporting the hook 86 to preserve this tension and to elevate the pipe each time it slips slightly at its binding point within the well. In still other cases, only a small degree of tension may be taken by the suspension means, so that a neutral point is created in the pipe, with the pipe string below this point standing in compression, so that there is a constant biasing force tending to force the pipe down. Again, the tension in the suspension means may be completely relaxed, so that the neutral point is "run off the top," so to speak, the weight of the generator being imposed on the upper end of the pipe, so that the pipe is entirely in compression.

The apparatus of Figs. 5 to 8 may thus be employed to remove drill pipe stuck within a well bore. A similar apparatus may be used to remove a "fish" which has become stuck in the bore. In Fig. 5a, I have illustrated the lower end portion of the pipe P as carrying a grappling tool 125 of any conventional type, engaged with the upper end portion of a "fish" 126, stuck in the well bore at 126a. The coupling to the fish is necessarily of a rigid nature, as by means of wedge slips 127, so that the acoustic waves are transmitted effectively from the lower end of the pipe P and grappling tool 125, acting together in this case as a mandrel, to the fish and thence to the site where the fish is frozen within the well, it being understood that the acoustic standing wave developed in the drill pipe is in this case continued on down the fish to the stuck point of the latter. Thus the stuck point of the fish becomes the lower end of the standing wave system, and a high impedance velocity node region; while the upper end portion of the drill pipe remains the lower impedance velocity anti-node region of the standing wave system. The elastic column in which the standing wave is set up consists in this case of the intercoupled pipe and fish. As in the case first described, a high impedance coupling, i.e., of the same order of impedance as the upper end of the pipe, is made between the wave generator and the pipe. Depending upon the length of the fish from its upper end to its stuck point, there may be a number of quarter wavelengths of the standing wave along the fish, or less than one quarter wavelength. In either event, the fish is a part of the standing wave system. It is also possible and correct in many cases to view the situation as one wherein an acoustic standing wave, or a portion thereof, is set up in the fish, while the drill pipe is treated as a high impedance coupling member between the generator and the fish. It will be evident that the drill pipe, even though forming a part of the standing wave system, will, everywhere along its length, have an impedance which is of as high an order as the upper end of the fish, and thus forms a coupling member of the requisite impedance. It remains necessary, of course, that the coupling component between the generator and the upper end of the pipe also have an impedance of at least the same order of magnitude.

It might also be here mentioned that the embodiment of Figs. 1-4 is similarly applicable to the removal of a stuck fish when equipped with a grappling tool such as shown in Fig. 5a.

Figures 9, 10, 11:
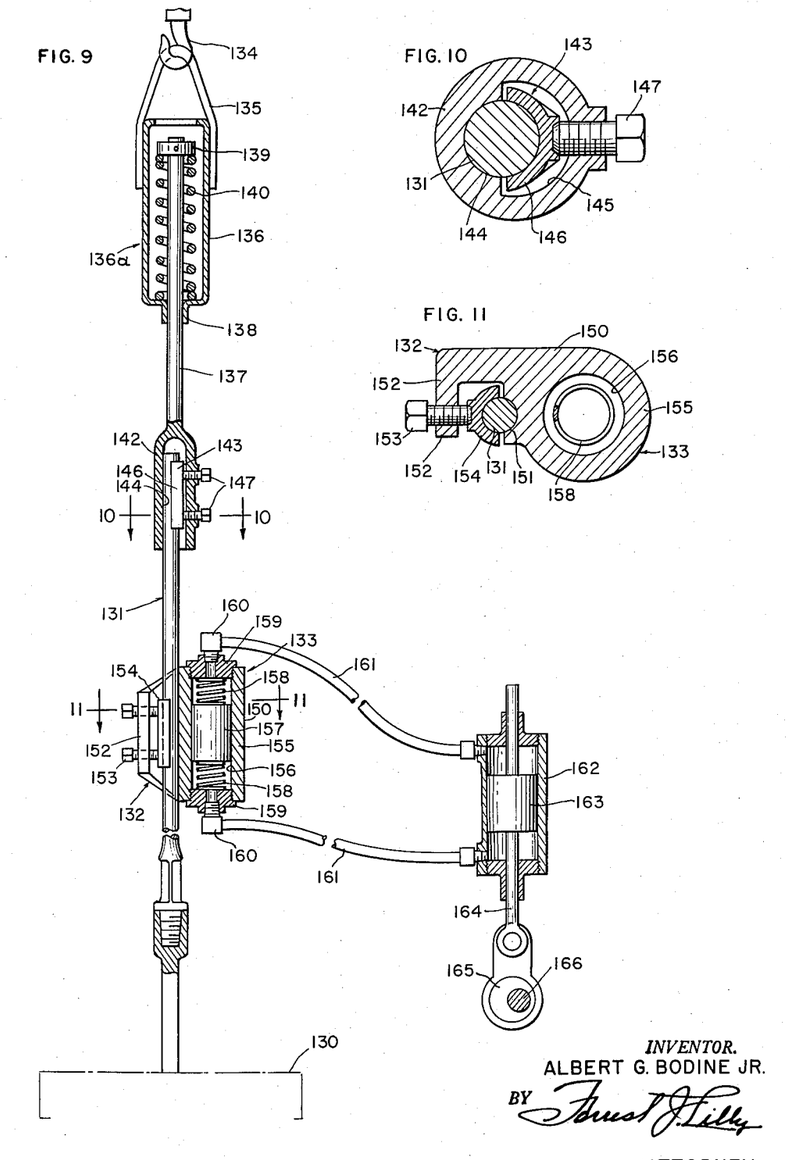
Fig. 9 is a view, partly in elevation and partly in vertical medial section, showing a modified form of the invention adapted for loosening a string of well pumping sucker rods.
Figs. 10 and 11 are sections on lines 10—10 and 11—11, respectively, of Fig. 9.

Figs. 9-11 illustrate another embodiment of the invention, designed for the purpose of loosening an oil well sucker rod string and or pump plunger frozen in a well by sand or other conditions. The upper end portion of the sucker rod string, above well-head 130, known usually as the polished rod, is indicated at 131, and clamped thereto as by means of clamp 132, is an acoustic wave generator 133. It will be understood that the sucker rod string and deep well oil pump below the well head may be of any conventional type. Numeral 134 designates a hook understood to be suspended by conventional derrick tackle, by which it may be raised and lowered, and this hook engages a bail 135 carrying the casing 136 of a low impedance spring isolator 136a. A suspension rod 137 is reciprocable through an opening in the bottom of casing 136 and has at its upper end a head 139 supported on the upper end of coil spring 140 whose lower end is supported on the lower end of casing 138. The lower end of rod 137 carries a socket 142 which receives the upper extremity of rod 131, and this socket is equipped with a clamp 143 adapted to clamp rod 131 rigidly within the socket. As here shown, the socket may have a half round bore 144 adapted to snugly receive the upper extremity of the polished rod 131, and with an enlarged half round bore 145 adapted to accommodate arcuate clamp member 146 which engages the rod and clamps it by means of screws 147.

The vibration generator 133 includes a housing 150 formed with a half round seat 151 (Fig. 11) adapted to engage the rod 131, and with a projecting arm 152 in which is mounted clamp screws 153 adapted to engage arcuate clamping member 154 engaging the rod 131 and clamping it tightly to its seat 151.

The generator housing 150 has a vertical cylinder 155 formed with a bore 156 in which is fitted a piston 157 positioned between coil compression centering springs 158 bearing against caps 159 screwed into opposite ends of bore 156. The caps 159 are bored and threaded to receive air hose fittings 160, which are connected by air hoses 161 to opposite ends of air cylinder 162. A piston 163 in cylinder 162 is reciprocated by connecting rod 164 driven from eccentric 165 on a shaft 166, which may be powered by any suitable prime mover, not shown, for instance, an internal combustion engine.

On each stroke of piston 163, air under pressure for moving piston 157 is delivered to the space in cylinder 156 at one end of piston 157 and removed from the space at the other end thereof. On the opposite stroke of piston 163, the reverse takes place. Accordingly, piston 157 is caused to oscillate within cylinder 156 between springs 158, which alternately elongate and contract to accommodate the action, and act to retard and stop the piston at the ends of its stroke.

The described oscillation of piston 157, acting on the end caps 159 of the cylinder through springs 158, results in alternating vertical reactive forces being exerted against the generator housing, and therefore on the sucker rod string to which it is rigidly clamped. Acoustic waves are accordingly set up in the sucker rod string, and transmitted to the site where the string or pump plunger is frozen within the well, the suspension means as described comprises a low impedance support, the spring isolator 136a preventing transmission of vibration energy to the hook 134 and derrick tackle above. The apparatus in this form permits tension to be exerted in the sucker rod string during operation by taking an upward pull on the conventional derrick tackle above hook 134. The output impedance of the piston type of wave generator is effectively near that of the upper end portion of the sucker rod string, assuring efficient transmission of power from the generator to the rod string.

Figure 12:
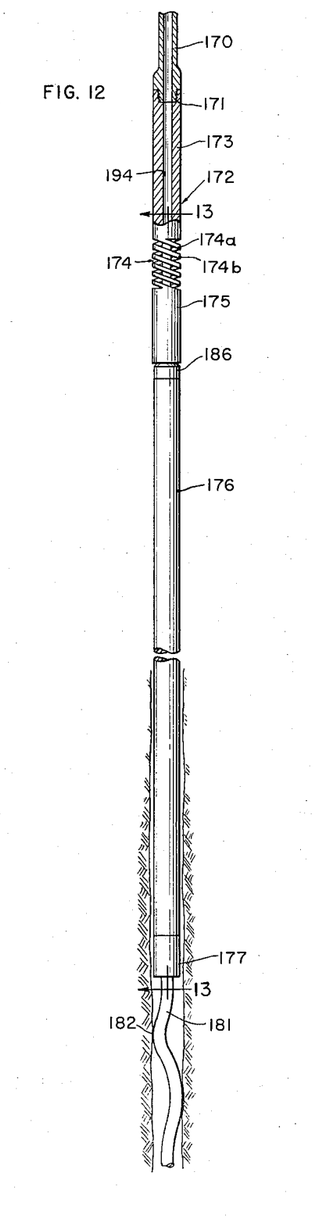
Fig. 12 is an elevational view of another embodiment of the invention.
Figure 13:
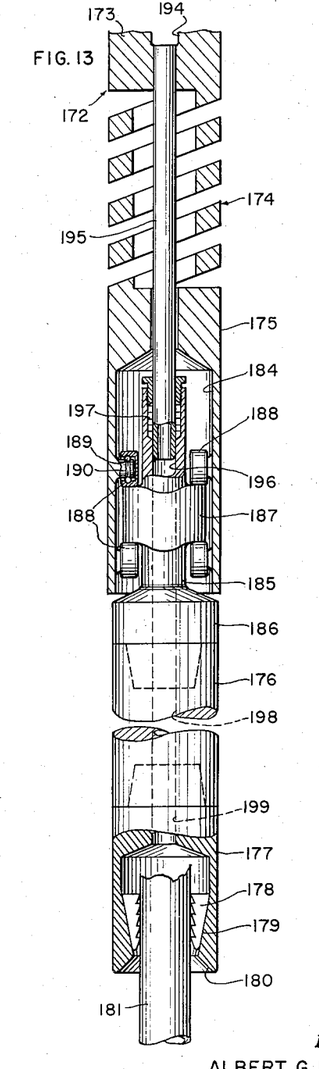
Fig. 13 is a section taken on line 13—13 of Fig. 12.

In Figs. 12 and 13 is shown an alterantive embodiment of the invention, designed particularly for loosening a "fish" stuck in a well bore during drilling operations. At 170 in Fig. 12 is indicated the lower end of a conventional drill pipe stem, understood to be suspended from the usual rotary table at the ground surface, by which it may be rotated to power the loosening operation. The lower end of the drill stem is coupled at 171 to the upper end of a driving tool 172, having a long, massive inertia collar 173, a spring section 174, and a lower section 175 equipped with means for imparting vertical reciprocation to the parts suspended therebelow. At 176 is indicated a heavy drill collar or mandrel, of a length of the order of 100 feet, to the lower end of which is coupled overshot grappling tool 177. The latter may be of any conventional type, being here indicated, somewhat conventionally, as containing serrated wedge slips 178 in a downwardly tapering bowl 179 above upwardly tapering mouth 180, and it will be understood how such a device is engaged with the upper end of the fish indicated at 181, and assumed to be stuck tightly in the well at some point below, as at 182. The wedge slips 178 furnish a means for coupling rigidly to the fish, in such a manner as to permit acoustic wave transmission to and downwardly along the length of the latter to the site 182 where the fish is frozen within the well.

The lower end portion 175 of the tool 172 is formed with an upwardly extending bore or socket 184, and receives a stem 185 extending upwardly from a coupling member 186 coupled, as indicated, to the upper end of collar 176. Stem 185 has rigidly mounted thereon a cam collar 187 whose upper and lower edges are contoured in the form of a sine wave. This cam collar rides between rollers 188 mounted by means of bearings 189 on stub shafts 190 projecting inwardly from the walls of member 175. Accordingly, assuming collar 176 to remain rotationally stationary, by reason of its inertia, by friction in the well bore, and by being clutched to the frozen fish 181, and assuming drill stem 170 and tool 172 to be rotated by the rotary table at the ground surface, the rollers 180 bearing on the sinuous outline of cam collar 187 cause the tool portion 175 to reciprocate vertically. The upper portion 173 of the tool 172 is of considerable mass, and the spring section 174 deforms as the portion 175 reciprocates, so that the massive section 173 and the drill stem above are not subject to material vibration, particularly if the spring section is tuned for the operating frequency range. The reaction of the reciprocating tool section 175, exerted through rollers 188 on cam collar 187, imposes a vertical oscillating force on the stem 185 on which the cam collar is mounted. This force results in alternate elastic elongation and contraction of stem 185, with the result that longitudinal elastic waves are transmitted down the collar 176, through the coupling at 177, and down the fish 181 to the site 182 where the fish is stuck in the well.

The apparatus of Figs. 12 and 13 is equipped with means for circulating fluid to aid the loosening operation, and for this purpose the fluid is pumped down the hollow drill stem, through a circulation bore 194 in the upper section 173 of tool 172, and thence through a tube 195 pressed into the lower end of section 173 and extending down through spring 174 into the upper end of hollow stem 185. The lower end of tube 195 is slidably fitted into the bore 196 of stem 185, and packing is provided at 197. The bore 196 continues down through coupling 186 to the circulation bore 198 of collar 176, and bore 198 leads to a bore 199 in grappling tool 177, the circulation liquid being discharged from the lower end of the latter into the well bore around the fish. This circulation fluid washes the area where the fish is stuck in the well, loosens and removes packed sand, and is returned up the well bore outside the tool string, carrying sand with it, much as practiced in rotary drilling.

The spring section 174 of the tool 172 is preferably milled out from solid stock, and, as here shown, comprises two helical elements 174a and 174b, as may be readily understood from an inspection of Figs. 12 and 13.

Operation consists in establishing acoustic wave transmission in the collar 176 and fish by rotating the drill stem, as earlier described. This acoustic wave transmission is continued down through the coupling at 177 to and downwardly through the fish to the site where the fish is stuck in the well, setting up a standing wave as described above, and the loosening action occurs in the general manner described in connection with the earlier embodiments.

Acoustic standing wave resonance is established in the collar 176 and fish down to the high impedance point where the fish is frozen in the well by control of the speed of rotation of a conventional rotary table (not shown) at the ground surface, by which the drill stem is turned. The occurrence of resonance is readily observed at the ground surface by increasing torque at the rotary table as resonance is approached. Characteristic audible manifestations are also readily observed at resonance. Despite the spring isolator 174, sufficient vibratory energy is transmitted up the string for these to be easily recognized.

Figures 14, 18:
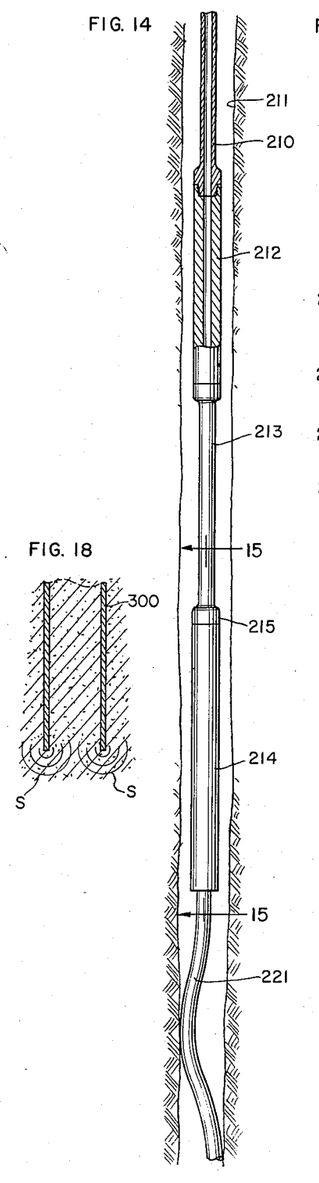
Fig. 14 is an elevation of another embodiment of the invention.
Fig. 18 is a diagrammatic view of the lower end portion of a tubular pile being driven into the earth according to the invention.
Figure 15:
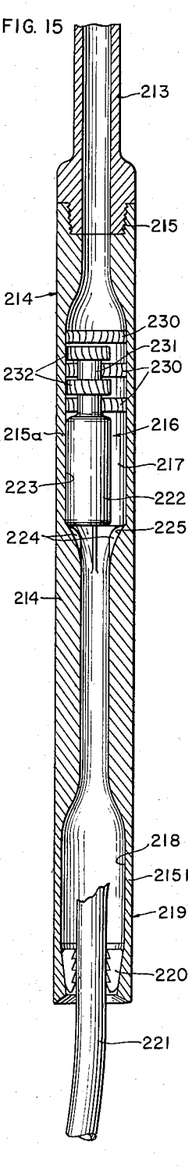
Fig. 15 is a section taken on line 15—15 of Fig. 14.

In Figs. 14 and 15 is shown still another embodiment of the invention, in this case characterized by a gyratory type of vibration generator in a tool suspended in the well from a string of drill pipe and operated by turbine means motivated by fluid pumped down the drill string. Numeral 210 designates the lower end portion of a hollow drill stem suspended in well bore 211, and to the lower end of drill stem 210 is coupled the upper end of a section of heavy drill collar 212. Coupled to the lower end of the latter is a relatively slender and flexible pipe section 213, and pipe section 213 suspends the vibratory tool 214 by means of a coupling indicated at 215. The tool 214 comprises a hollow body containing a turbine driven vibration generator 216.

Figure 16:
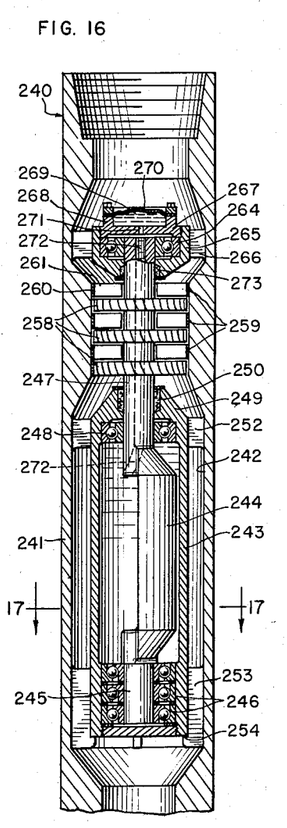
Fig. 16 is a vertical medial section showing a modification of Fig. 15.

The body or mandrel 214 is of good elastic material, such as steel, and relatively thick walled excepting for an intermediate section 215a, wherein is formed an enlarged cavity 217 for accommodation of generator 216, and a lower end section 215b which is formed with the socket 218 of an overshot grappling tool 219. The latter is conventionally shown with tapered extremity containing wedge slips 220 adapted to rigidly secure a fish 221.

The generator 216 comprises a cylindrical inertia roller 222 adapted to roll around a cylindric raceway 223 formed inside body section 215a. The lower end of roller 222 is vertically supported by the curved shoulders of ribs 224 formed inside body 215 at the lower end of the generator cavity 217, the interior walls of section 215a joining the thick walled section below by a tapered surface 225 so as to provide adequate clearance for downward liquid flow from chamber 217.

Tightly mounted in the upper part of chamber 217, above roller 222, are a plurality of vertically spaced turbine stators 230, and between these, on an axial stem 231 extending upwardly from roller, are tightly mounted a plurality of turbine rotors 232. Fluid pumped down through drill stem 210, inertia collar 212, flexible pipe 213 and into the upper end of body 214, is set into rotation in passing stators 230, and imparts rotation to rotors 232 and therefore to inertia roller 222. The roller accordingly rolls about raceway 223. It is of interest to note that, since the circumference of roller 222 is less than the circumference of its raceway 223, it will rotate on its axis at a lesser number of revolutions per second than its number of trips per second around the periphery of the raceway. Any slip between the surfaces of the roller and the raceway will affect this difference. It is the number of trips per second around the periphery of the raceway that determines the frequency of the generator.

The operation of the acoustic wave generator is as follows: The roller 222 rolling around the raceway 223 exerts on the body 215 a centrifugal force, and it will be seen that this force, rotating about the longitudinal axis of the body 215, elastically bends the surrounding portion of the body, moving it around in a gyratory path. The body 215 does not bodily rotate, but has a gyratory action which, upon analysis, will be seen to be the resultant of two perpendicular transverse linear harmonic vibrations in quadrature. A generator of this type is described more particularly in my co-pending application entitled Apparatus for Generating and Transmitting Sonic Vibrations, filed January 28, 1955, Ser. No. 484,627, now abandoned. As described in said application, the elastic gyratory deformation of the portion of the body 215 surrounding the inertia roller 222 is propagated by corresponding elastic waves traveling longitudinally along the body 215. These are transmitted to and along the fish 221 to the site where the fish is stuck in the well, where the wave is reflected back; and also, in the opposite direction, into and along the flexible pipe to the point of junction of the latter with the end of the heavy inertia collar 212, where the wave is reflected back. Under such conditions, standing wave resonance is automatically developed along the body 215, the fish down to the stuck point, and the flexible pipe 213 up to the inertia collar 212, with a velocity anti-node (region of maximum deformation amplitude) at the site of the generator, and velocity nodes at the point where the fish is stuck in the well, and at the junction of flexible pipe 213 with collar 212. The turbine driven roller is constrained by back reaction from this resonant system to roll around its raceway at the resonant frequency. There may be additional nodes and anti-nodes in the system under certain conditions, but those described above are characteristic of the system.

The described resonant standing wave developed in the system, with a velocity node at the site where the fish is stuck in the well, tends rapidly to loosen the fish. The gyratory wave action described, while propagated longitudinally of the tool string, takes place in a transverse plane. At the location where the fish is frozen in the well, where a velocity node of the wave occurs, the elastic stress magnitude is maximized, and gyratory motion minimized. Under these conditions, the fish is powerfully "worked," and rapidly broken free of whatever has been holding it fast.

Figure 17:
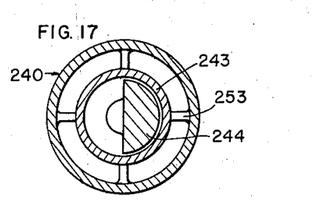
Fig. 17 is a section on line 17—17 of Fig. 16.

In Figs. 16 and 17 is shown a modification of the system of Figs. 14 and 15, being similar to that of Figs. 14 and 15 excepting for employment of a modified type of gyratory acoustic wave generator. The tool 240 of Figs. 16 and 17 may be considered a substitution for the tool 214 of Figs. 14 and 15, and it will be understood that the device of Fig. 16 may be suspended from a drill string similar to that shown in Fig. 14, and may be equipped with an inertia collar and a flexible pipe section similar to the elements 212 and 213 of Fig. 14, the upper end of the tool 240 being understood to be coupled to the lower end of a flexible pipe such as 213. Further, the lower end portion of the tool 240 may be formed with a grappling tool, similar in all respects to that provided at the lower end of the tool 214 of Figs. 14 and 15.

With the understanding stated in the preceding paragraph, the tool 240 comprises a hollow body 241, generally similar to the body 215 of Fig. 15, the lower portion of which is omitted from Fig. 16. The bore through the hollow body 241 has an enlarged cavity 242 in which is contained, at an annular spacing from the corresponding thin wall section of the body, a cylindrical case 243 for an unbalanced or eccentric rotor 244. This rotor has at the bottom a shaft 245 mounted in suitable bearings 246 placed in the lower end of casing 243, the lower end of the latter being closed by a threaded closure disc. Rotor 244 has extending upwardly from its upper end a shaft 247, supported in a bearing 248 placed in the upper end of casing 243. The casing 243 has an upper end portion 249 formed with suitable packing 250 for shaft 247. The casing 243 is positioned within the thin wall portion of body 241 by means of ribs 252 extending inwardly from body 241 at the top, and similarly by ribs 253 at the bottom, the last mentioned ribs being also formed with shoulders at 254 for vertical support of the casing 243.

The rotor shaft 247 carries a plurality of axially spaced turbine rotors 258, and above each of these is a stator 259. The stators 259 comprise rims 260 tightly seated in the bore of the body 241, and a multiplicity of radial vanes 261.

The upper extremity of rotor shaft 247, above the hydraulic turbine described in the preceding paragraph, is provided with an outboard bearing at 264, carried within a cup 265, and has an upwardly extending annular wall 268 forming a chamber 269 which is closed at the top by a flexible diaphragm 270.

Cap 267 has a central aperture 271, which communicates with a longitudinal passage 272 extending longitudinally through rotor 247 and opening at the bottom inside rotor case 243. The cup 265 has at the bottom a suitable packing 273 forming a fluid tight seal with shaft 247. Casing 243 is filled with oil and this oil extends upwardly through passageway 272 and aperture 271 into chamber 269. In the operation of the apparatus, the hollow pipe string carrying the device 240 is filled with driving fluid, and the hydraulic static head of this fluid imposed on the flexible diaphragm 270 pressurizes the oil system and prevents leakage of the external driving fluid into the oil system through the various packings.

An inspection of Fig. 16 will reveal that a fluid passage has been formed downwardly through the tool 240 around the outside of the bearing cup 265 to the region of the turbine, and from the lower end of the turbine around the outside of rotor housing 243 to the downwardly extending bore below. The fluid is deflected by the stator vanes to drive the rotors of the turbine, and therefore the unbalanced inertia rotor 244. Rotation of the latter generates a centrifugal force, the reaction of which is transmitted through the rotor shafts, the rotor casing 243, and the supporting ribs 252 and 253 to the body 241. Apart from the detailed action of the specific gyratory acoustic wave generator of Fig. 16, the system is the same as that of Figs. 14 and 15, and the description need not be repeated.

The application of the invention to the driving of piles has been mentioned hereinabove, particularly in connection with the embodiments of Figs. 1–8. It has also been described how a substantial compressive loading of a stuck pipe, by use of a high neutral point, or by standing the entire pipe in compression against the support afforded by the frictional bind between the pipe and the surrounding media at the stuck region, results in a compressive or weight bias which forces the pipe deeper as the frictional bind is loosened. The same apparatus and operation are useful for the driving of piles in the earth, and apparatus similar to the embodiment of Figs. 5–8 is particularly adapted for use in this application of the invention.

Assume a tubular or pipe type of pile, and assume that the apparatus of Figs. 5–8 is employed. Assume further that the generator of said figures is hung in mid-air (rather than rested on the ground or a platform), and that a large amount of weight is imposed on the pipe, so that all or a large part thereof stands in compression. This denotes either a high neutral point, or a neutral point effectively run off at the top by relaxing the tension in the suspension means. The entire weight of the generator may also be imposed on the pipe, by complete relaxation of the tension in the suspension means. Assume further that the pipe has been started into the ground, either by lowering it into a bore, loading it sufficiently to penetrate for a distance, or by some conventional driving operation. Operation carried on as described hereinabove in connection with loosening of frictionally bound pipes standing in compression will then drive the pile deeper into the ground. Fig. 18 is a diagrammatic view of the lower end of a tubular pile 300, and shows at s sound waves radiating from the lower end of the pile into the surrounding earth. The lower end of the pile, standing in compression on the earth below it, will be understood to be a high impedance point of the acoustic standing wave set up in it by the wave generator coupled to its upper end, and to be the location of a velocity anti-node, where minimum elastic deformation in the longitudinal direction, at maximum force amplitude, must occur. The downward force exerted by the pile on the earth, owing to this periodic downwardly exerted force superimposed on the steady downward force owing to compressive loading, shears the soil or rock under the pile, and the radiated sound waves compact the soil or rock laterally, so that the pile can be forced down. It has been demonstrated in practice that piles can be very effectively driven into the earth in this manner.

The invention has now been described through illustration of a number of illustrative embodiments. It is to be understood, of course, that these are merely illustrative of various different inventive forms in which the broad invention may be embodied, and are not to be considered as exhustive of the complete range of equivalents coming within the broad scope of the appended claims.

I claim:

1. The method of loosening a member stuck within a well, which member is firmly connected to or a part of a solid elongated elastic column in the well such as a pipe or rod string, that includes: rigidly coupling the vibratory output member of an acoustic wave generator to an acoustically free portion of said column spaced longitudinally of the column away from the stuck point, and operating said generator at a resonant frequency of the column so as to establish a velocity node adjacent said stuck point and a velocity antinode at the coupling point adjacent said generator, and at a power output level developing a cyclic force in the member at the stuck point which exceeds and works against the holding strength on said member at the stuck point.

2. The method of loosening a member stuck within a well, which member is firmly connected to or a part of a solid elongated elastic column in the well such as a pipe or rod string, that includes: developing alternating elastic contraction and dilation of the member at the stuck point by rigidly coupling to said column, at a point spaced longitudinally of the column from the stuck point, the vibratory output member of an acoustic wave generator, with said vibrating output member positioned to have a component of vibrating movement in the direction of elongation of said column, and operating said generator at a resonant frequency of the column for a longitudinal mode of standing wave vibration thereof characterized by a velocity node adjacent said stuck point and a velocity antinode at the coupling point adjacent said generator.

3. The method of loosening a member stuck within a well, which member is firmly connected to or a part of a solid elongated elastic column in the well such as a pipe or rod string, that includes: rigidly coupling the vibratory output member of an acoustic wave generator to an acoustically free portion of said column spaced longitudinally of the column away from the stuck point, with said vibratory output member positioned to have a component of vibratory movement in the direction of elongation of said column, and operating said generator at a resonant frequency of said column for a longitudinal mode of standing wave vibration thereof characterized by a velocity node adjacent said stuck point and a velocity antinode at the coupling point adjacent said generator, whereby to develop in the member at said stuck point a cyclic force longitudinal of the column and working against the holding strength on said member at the stuck point, and also a cyclic elastic dilation and contraction of the member at the stuck point.

4. The method as defined in claim 1, including also the step of exerting a longitudinal biasing force on the column during operation of said generator.

5. The method as defined in claim 1, including also the step of exerting a tension in said column and member extending down to the stuck point, whereby the column is biased to move upwardly as loosening occurs.

6. The method as defined in claim 1, including also the step of exerting a limited tension in the column extending down to a neutral point, allowing the rest of the column and member to stand in compression, whereby the column is biased to move downwardly as loosening occurs.

7. The method as defined in claim 1, including also the step of causing substantially the entirety of the column to stand in compression, whereby the column is biased to move downwardly as loosening occurs.

8. The method as defined in claim 1, wherein the member to be freed is stuck throughout a substantial vertical distance, and the generator is coupled to the column above the stuck region, and including the further step of lowering the operating frequency of the generator with decreasing resonant frequency of said column as the member is progressively freed in a downward direction.

9. The subject matter of claim 1, wherein a gyratory type of acoustic wave generator is used and has its gyratory output member rigidly coupled to said column, with said generator so oriented that the gyratory motion of said output member is in a plane transverse to the column.

10. In a system for loosening a member stuck within a well, the combination comprising; a solid elongated elastic column in said well, such as a pipe or rod string, an attachment means on the lower end of said column, such as a conventional grappling tool, for firmly engaging said member, an acoustic vibration generator having a vibratory output member, means rigidly coupling said vibratory output member to an acoustically free portion of said column spaced longitudinally of the column from the stuck point, and power means operating said generator, said generator having a vibratory impulse magnitude in relation to the average cross section of said column so that said column can be driven by said power means at a resonant frequency of said column which establishes a velocity node at the stuck point and a velocity antinode adjacent the coupling point of the column to the generator and at a power output level developing a cyclic force in the member at the stuck point which exceeds and works against the holding strength on said member at the stuck point.

11. The subject matter of claim 10, including also a flexible low impedance support for said generator connected to said vibratory output member thereof.

12. The subject matter of claim 10, wherein said power means includes a prime mover having a characteristic speed responsiveness to load.

13. The subject matter of claim 10, wherein said power means includes an internal combustion engine of a type which is automatically speed responsive to variable load.

14. The subject matter of claim 10, wherein said prime mover comprises a gas engine which is speed responsive to torque load at the resonant standing wave frequency of said column, whereby said engine automatically reduces its speed in correspondence with lowering resonant frequency as said column is progressively freed along its length.

15. The subject matter of claim 10, including also means connected with the column for exerting a tension therein.

16. The subject matter of claim 10, wherein the vibratory output member of said generator is oriented for vibration with a component of motion longitudinally of said column, whereby to establish a longitudinal standing wave in said column when operating at the longitudinal resonant frequency of the column.

17. The method of the character described, comprising: coupling the vibratory output element of a vibrator to an elastic column system embodying a member held within the earth, said coupling being made to an acoustically free portion of said column system spaced longitudinally of said column system from the holding region within the earth, said coupling having an impedance of the order of that of said position, applying a bias force from said member to said holding region, and simultaneously operating said vibrator at a resonant frequency of said column system which establishes a vibration pattern with cyclic impulse force in said column system adjacent said holding region, and at an output level which develops said cyclic impulse force of such magnitude that the combined bias force and said cyclic impulse force value exceeds the resistance to net movement experienced by said member within the earth.

18. The method of claim 17 wherein said column system includes a mandrel, and wherein said held member is a pipe held in the earth, and wherein said method includes the steps of coupling said vibrator to said mandrel member, and coupling said mandrel to said pipe so that elastic vibrations of said mandrel are transmitted to said pipe.

References Cited in the file of this patent

UNITED STATES PATENTS

| | | |
|---|---|---|
| 2,139,076 | Gates | Dec. 6, 1938 |
| 2,241,532 | Barnes | May 13, 1941 |
| 2,340,959 | Harth | Feb. 8, 1944 |
| 2,350,212 | Bodine | May 30, 1944 |
| 2,641,927 | Grable et al. | June 16, 1953 |
| 2,667,932 | Bodine | Feb. 2, 1954 |
| 2,670,801 | Sherborne | Mar. 2, 1954 |
| 2,730,176 | Herbold | Jan. 10, 1956 |
| 2,743,585 | Berthet et al. | May 1, 1956 |
| 2,808,887 | Erwin | Oct. 8, 1957 |
| 2,890,757 | Bodine | June 16, 1959 |

UNITED STATES PATENT OFFICE
CERTIFICATION OF CORRECTION

Patent No. 2,972,380                  February 21, 1961

Albert G. Bodine, Jr.

It is hereby certified that error appears in the above numbered patent requiring correction and that the said Letters Patent should read as corrected below.

Column 18, line 7, for "position" read -- portion --.

Signed and sealed this 29th day of August 1961.

(SEAL)
Attest:

ERNEST W. SWIDER
Attesting Officer

DAVID L. LADD
Commissioner of Patents